US007152947B2

(12) United States Patent
Wu

(10) Patent No.: US 7,152,947 B2
(45) Date of Patent: Dec. 26, 2006

(54) SELECTING MODES FOR PRINTING

(75) Inventor: Yifeng Wu, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 410 days.

(21) Appl. No.: 10/796,757

(22) Filed: Mar. 8, 2004

(65) Prior Publication Data
US 2005/0195232 A1 Sep. 8, 2005

(51) Int. Cl.
B41J 2/15 (2006.01)
(52) U.S. Cl. .......................... 347/41; 347/15
(58) Field of Classification Search ............... 347/15, 347/41, 43, 16, 12
See application file for complete search history.

(56) References Cited

U.S. PATENT DOCUMENTS

| 4,999,629 | A | | 3/1991 | Katsuta |
| 5,270,837 | A | | 12/1993 | Chen et al. |
| 5,661,507 | A | | 8/1997 | Sperry |
| 6,089,697 | A | * | 7/2000 | Tajika et al. ................. 347/43 |
| 6,130,685 | A | * | 10/2000 | Matsubara et al. ........... 347/41 |
| 6,247,787 | B1 | | 6/2001 | Giere et al. |
| 6,328,396 | B1 | | 12/2001 | Smith et al. |
| 6,481,818 | B1 | | 11/2002 | Cox et al. |
| 6,532,026 | B1 | | 3/2003 | Takahashi et al. |
| 6,533,393 | B1 | | 3/2003 | Meyer et al. |
| 6,665,094 | B1 | * | 12/2003 | Lapstun ..................... 358/1.9 |
| 2002/0060805 | A1 | | 5/2002 | Tomita |

* cited by examiner

Primary Examiner—Lamson Nguyen

(57) ABSTRACT

A method of printing data defining an arrangement of a first set of image elements within an array of first and second sets of image elements. The first set may have a different color characteristic than the second set. At least one mode may be selected for placement of colorant-based representations of the image elements of the first set onto a print medium based on one or more values corresponding to the percentage of image elements of the first set in at least one of the array and one or more portions of the array. Colorant-based representations may be placed onto the print medium according to the at least one mode selected and in the arrangement defined by the data.

27 Claims, 4 Drawing Sheets

SELECTING MODES FOR PRINTING

BACKGROUND

A printer may create a printed image from print data by placement of colorants in a pattern onto a print medium. The colorants may be placed onto the print medium in an order determined, for example, by the physical arrangement of colorant nozzles on an inkjet printhead, and the direction of scan of the printhead. However, this order may affect the appearance of the printed image. For example, if the colorants are destined to overlap in a region of a print medium, the order in which such colorants are placed in the region may affect their hue. Accordingly, a fixed order of placement of colorants may provide greater color consistency throughout a printed image. However, in some cases a fixed order of placement may produce a printed image more slowly than an alternating or more variable order of placing colorants and may not substantially improve some printed images.

DETAILED DESCRIPTION

Methods and apparatus are provided for printing images using printing modes selected according to a content analysis of print data corresponding to the images. The print data may correspond to printed images that are text, graphics, photographs, or portions or combinations thereof, among others. The methods and apparatus may be used to print images bi-directionally or uni-directionally according to the content of the images. Uni-directional or bi-directional printing for each image may be selected according to the percentage of non-white (printed) pixels or white pixels (nonprinted) in the images. For example, some types of raster-based images, such as larger raster-based graphics and larger photographs may be printed uni-directionally. This uni-directional printing may reduce a hue shift visible between adjacent swaths when printed bi-directionally. Vector-based images, such as line-based graphics or text, and some types of raster-based images, such as smaller raster-based graphics and smaller photographs may be printed during bi-directional movement of a printhead. This bi-directional printing may be suitable for vector-based content and smaller raster-based images to increase printing speed relative to printing uni-directionally. In particular, bi-directional printing may be suitable when a greater hue shift between adjacent swaths, produced by bi-directional relative to uni-directional printing, is not a substantial problem.

Figure 1:
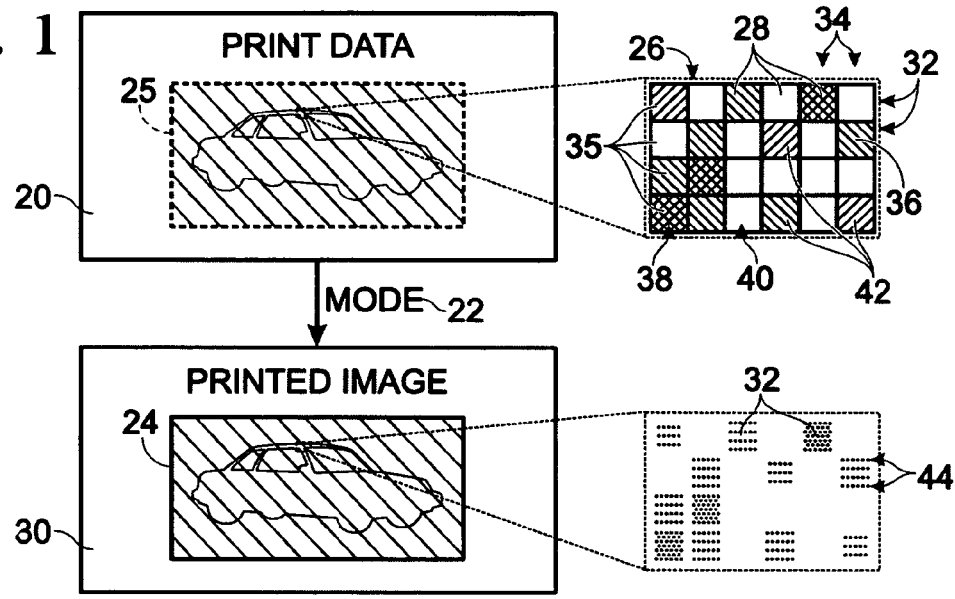
FIG. 1 is a schematic view of print data defining an array of image elements, with the content of the print data being used to select a mode of printing a printed image, in accordance with the present teachings.

FIG. 1 shows print data 20 being used to select a mode 22 of printing a printed image 24 according to the content of the print data. Print data 20 may define a data representation 25 including an array 26 of image elements 28 or pixels. Mode 22 may be selected by analyzing the content of the print data, and particularly by determining an aspect of the defined array. Determining the aspect of the array is described below. The selected mode (or modes) then may be utilized to create printed image 24 on a print medium 30. In particular, the selected mode may define any suitable aspect of how colorant-based representations 32 of the image elements are placed on print medium 30. Accordingly, the aspect may be an order or sequence, a rate, a number of passes (such as a one-pass or a multi-pass mode), and/or a direction of placement of colorant-based representations 32, among others.

Image elements 28 may have any suitable arrangement and properties. The image elements of array 26 may be disposed in a matrix, that is, in rows 32 and columns 34. Each image element may have a defined color. In the present illustration, the image elements are of four different colors 35. In some embodiments, the defined color may have a lightness-darkness value disposed within a range of such possible values, so that the image element is a substantially continuous-tone pixel or contone pixel.

Each image element may have a color characteristic 36. The color characteristic is any generalized or specific aspect of the defined color, such as a category to which the predefined color belongs (such as white or non-white, foreground or background, printed or nonprinted, etc.) or a specific color property. Each image element may have a color characteristic defined by any suitable amount of print data 20. The color characteristic may be defined within any suitable color space, such as red-green-blue (RGB), chromaticity coordinates (XYZ), cyan-magenta-yellow-black (CMYK), hue-saturation-value (HSV), or the like, and may be defined according to any suitable boundary (or boundaries) or threshold(s) within such color space.

The image elements of the array may belong to two or more different sets 38, 40 each having a different color characteristic 36. In the present illustration, first set 38 of the image elements has a non-white color characteristic 36, that is, each member of this set has a defined color that is non-white. Second set 40 of the image elements has a white color characteristic so that each member of this set has white as its defined color. Other exemplary pairs of sets with a different color characteristics may be defined by the presence or absence of a defined color, black or non-black as the defined color, or by any other preselected color criteria as indicated above. In some embodiments, the sets of image elements may be defined according to the color of the print medium, termed the background color. Accordingly, image elements of the array may be foreground elements, with a defined color distinct from the background color, or background elements, with a defined color corresponding to the background color. In the present illustration, the print medium is white, so that first set 38 includes foreground elements for which colorant-based representations 32 are placed on the print medium. Furthermore, second set 40 includes background elements for which representations are produced on printed image 24 without colorant placement at the positions of such representations on the print medium.

First set 38 of non-white image elements is disposed in an arrangement 42 within array 26. Colorant-based representations 32 of the image elements of the first set may be placed on the print medium according to mode 22 and disposed in arrangement 42 defined by the print data.

Each colorant-based representation 32 may be created by one or more colorant pixels 44 on the print medium. The colorant pixels may be halftone pixels, created by placement or non-placement of a particular colorant(s) at different positions within each colorant-based representation. Alternatively, or in addition, the colorant pixels may be contone pixels produced, for example, by dithering and/or by placing different amounts of the colorant(s) at pixel positions of the print medium. Each colorant pixel may be created by one colorant or through overlap of two or more placed colorants. A colorant, as used herein, may be any visible material applied selectively to, and/or modified selectively on, a print medium. Exemplary colorants may be dyes, such as toners for laser printers or inks for inkjet printers. A print medium, as used herein, may be any medium on which colorants may be placed positionally, including sheet media such as paper, plastic, fabric, metal, etc.

Mode 22 may be selected by a content analysis of the print data, and particularly by determining an aspect(s) of the first set 38 of image elements within array 26. The aspect(s) may relate to the frequency of occurrence of image elements of the first set within the array, and/or within one or more portions of the array, such as in one or more rows or regions of the array. Accordingly, the aspect(s) may be one or more values corresponding to the percentage of image elements of the first set within the array, or within one more portions of the array. This value (or values) may be determined, for example, by calculating the exact percentage of first elements within the array or portions thereof, or by estimating the percentage based on sampling a subset(s) of the array. The value (or values) may be compared to one or more predefined thresholds to select a mode. For example, the thresholds may define a threshold percentage and a threshold number of rows, so that a first mode is selected for portions of the array exceeding the threshold percentage for the threshold number of rows, and a second mode selected for the remaining portions of the array. Further aspects of content analysis of print data are included below in relation to FIGS. 5–10.

Figure 2:
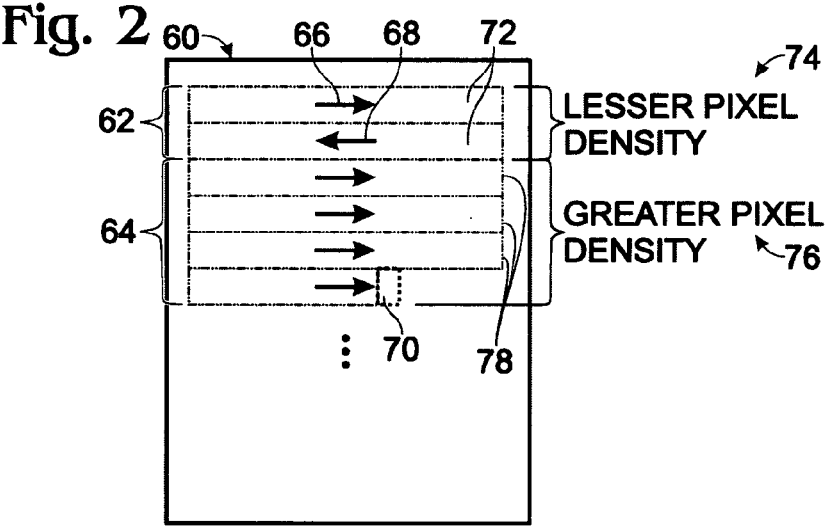
FIG. 2 is a schematic view of a printhead delivering colorants to a print medium during a successive pair of bi-directional passes over the medium followed by a set of sequential uni-directional passes over the medium, to create printed output with lesser and greater printed pixel densities, respectively, in accordance with the present teachings.

FIG. 2 shows a sheet of print medium 60 being processed by different modes 62, 64 of printing. Each mode may be selected according to a content analysis of the corresponding print data. Each mode may be defined according to the direction(s) 66, 68 in which a printhead(s) 70 travels over print medium 60 during successive passes 72 of colorant delivery. Bi-directional mode 62 may be selected to deliver colorant for portions of the print data defining a lesser pixel (or image element) density, indicated at 74. This bi-directional mode may deliver colorant in opposing directions 66, 68 during a pair of successive passes 72. Uni-directional mode 64 may be selected to deliver colorant for portions of the print data defining a greater pixel (or image element) density, indicated at 76. This uni-directional mode may deliver colorant in the same direction (66 or 68) during two or more successive passes.

Each pass, as used herein, includes colorant delivery to a print medium. Successive delivery passes may deliver colorant in adjacent swaths 78 to at least substantially nonoverlapping regions of the print medium, as illustrated here, to effect single-pass printing. Alternatively, or in addition, the passes may deliver colorant in interlaced swaths and to overlapping regions of the print medium, to effect multiple pass printing.

Figure 3:
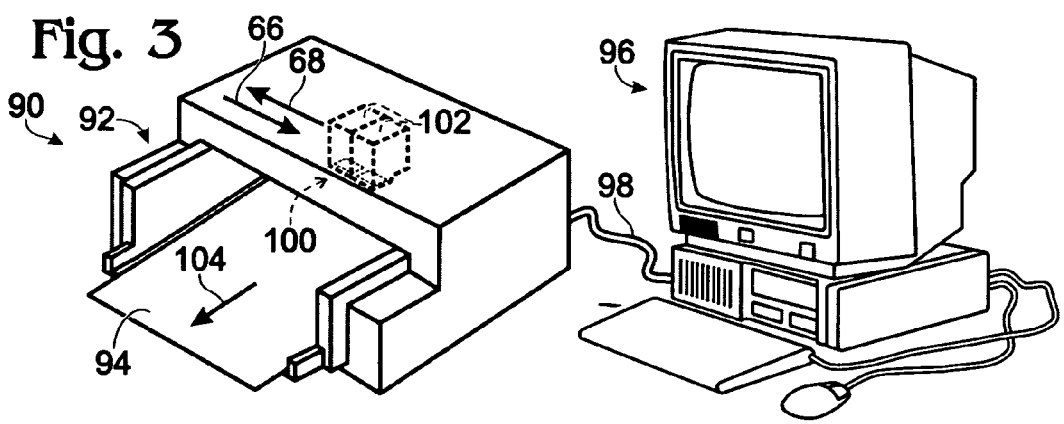
FIG. 3 is a view of a system for printing images using modes selected based on the content of print data, in which a printer of the system is configured to deliver colorants from a printhead as the printhead moves bi-directionally or uni-directionally according to the mode selected and thus according to the content of the print data, in accordance with the present teachings.

FIG. 3 shows a system 90 for printing images using modes selected based on the content of print data. System 90 may include a printer 92 configured to print images onto print medium 94. System 90 also may include a computing device 96 in communication with the printer, shown at 98, and configured to send print data in any suitable form to the printer.

Printer 92 may be any printing device configured to deliver one or more colorants positionally to print media. The printer may be an inkjet printer or a laser printer, among others. The printer may include a printhead 100. The printhead may be any structure (or structures) from which colorant(s) is dispensed to print media. In the present illustration, printhead 100 is an assembly of printheads included in colorant cartridges 102. In other embodiments, colorant reservoirs may be disposed in a spaced relation to their printheads, that is, off-axis.

The printhead(s) may be stationary or may move relative to print media. In the present illustration, the printhead(s) is configured to scan bi-directionally, in directions 66, 68, along an x-axis defined by the printer. Each scan may function as a pass for colorant delivery (bi-directional printing), and/or approximately half of the scans may function as passes for colorant delivery (uni-directional printing), among others. Uni-directional printing may be in either direction, for example, left to right or right to left. The direction selected for printing an image uni-directionally may be a predefined direction (such as always left to right), or may be defined according to context, such as the position of the printhead(s) at the outset of uni-directional printing. The printer may be configured to move print media along a y-axis 104 disposed orthogonally to the scan or x-axis of the printer.

Figure 4:
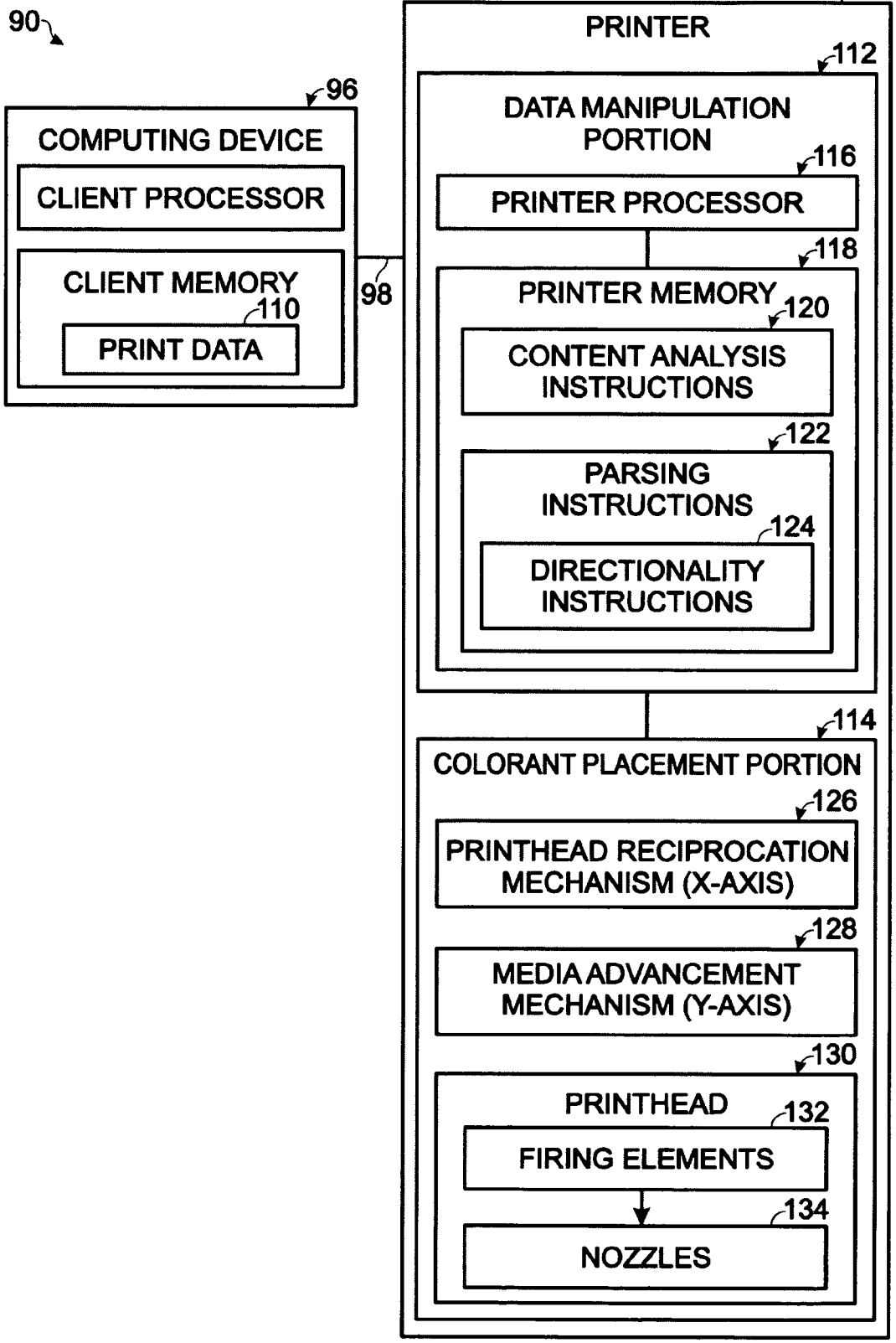
FIG. 4 is a schematic view of the system of FIG. 3, in accordance with the present teachings.

FIG. 4 shows a schematic view of system 90. Computing device 96 may be configured to send print data 110 to printer 92. Computing device may be configured to receive print data, perform a content analysis of the print data and/or select a mode(s) of printing the print data, among others. However, in the present illustration, printer 92 is configured to perform these and other tasks that could be assigned alternatively, or in addition, to computing device 96.

Printer 92 may include a data manipulation portion 112 and a colorant placement portion 114. Data manipulation portion 112 may be configured to receive print data 110 from computing device 96 and process the print data into printing instructions for the colorant placement portion. As part of this processing, data manipulation portion 112 may perform a content analysis of the print data and select one or more modes for printing the print data. Colorant placement portion 114 may be configured to dispense colorant positionally to a print medium using the modes selected by the data manipulation portion. Accordingly the modes may relate to how the colorant placement portion performs its functions.

Data manipulation portion 112 may include a printer processor 116 and printer memory 118. The printer processor may be configured to perform manipulation of data received from the computing device and/or from the printer memory, including logic and/or arithmetic operations, among others. Such data may include the print data and processing instructions for the print data. Printer memory 118 may include content analysis instructions 120 and parsing instructions 122. The content analysis instructions may be configured to determined one or more values from the print data and compare those values with at least one predefined threshold (or threshold value) to select one or more printing modes. Parsing instructions 122 may assign portions of the print data to particular passes performed by colorant placement portion 114. The parsing instructions may include directionality instructions 124 that assign a direction to each of the particular passes.

Colorant placement portion 114 may include a printhead reciprocation mechanism 126, a media advancement mechanism 128, and a printhead(s) 130. Printhead reciprocation mechanism 126 may scan bi-directionally, as illustrated in FIG. 3. Alternatively, or in addition, the printhead reciprocation mechanism may move in any other suitable direction, including orthogonal directions, among others. Media advancement mechanism 128 may move print media along an axis orthogonal to the axis defined by the printhead reciprocation mechanism. In some embodiments, the printhead reciprocation mechanism may perform the function of the media advancement mechanism by moving orthogonally. Alternatively, or in addition, the media advancement mechanism may move the media in orthogonal directions. Printhead(s) 130 may include firing elements 132, such as heater elements or piezoelectric elements. The firing elements may operate to expel colorant droplets from nozzles 134 and onto print media.

Figure 5:
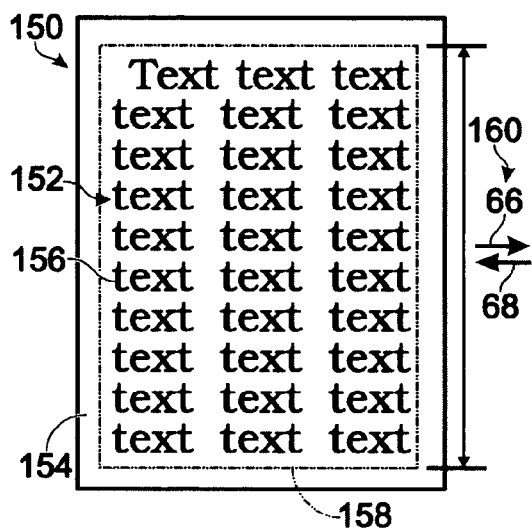
FIG. 5 is a partially schematic view of text printed bi-directionally on a print medium, in accordance with the present teachings.

FIG. 5 shows printed output 150 including a text image 152 printed bi-directionally on a print medium 154. The text image and its text 156 may be printed within a print region 158 of the medium. The text image may be printed during a plurality of sequential printhead passes over print medium 154, with pairs of successive passes being in opposing directions 66, 68, as indicated at 160.

Figure 6:
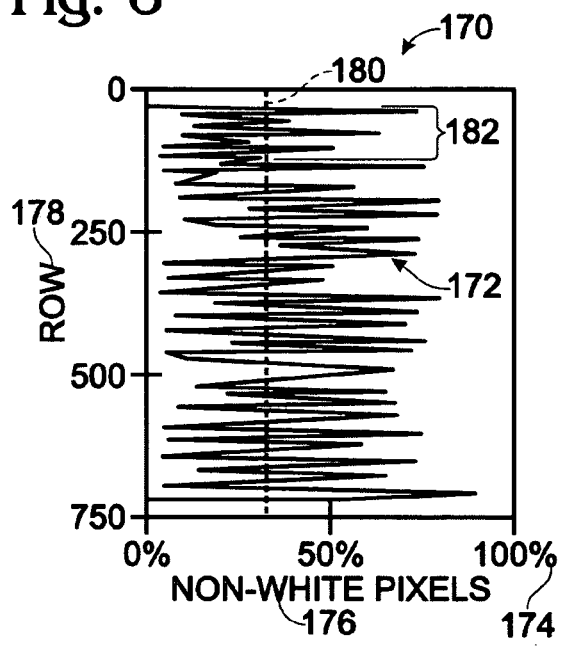
FIG. 6 is a graph of a content analysis of print data corresponding to the text of FIG. 5, in accordance with the present teachings.

FIG. 6 shows a graph 170 of a content analysis of print data corresponding to text image 152 of FIG. 5. Graph 170 plots contone pixel count 172 derived from print data corresponding to the text image. In particular, the percentage 174 of non-white contone pixels 176 is plotted versus rows 178 of image elements defined by print data for text image 152. Here, in FIGS. 5 and 6, and below in FIGS. 7–10, the printed output and its corresponding content analysis graph are aligned horizontally.

Graph 170 also indicates predefined thresholds 180, 182 against which non-white pixel count 172 may be compared. In the present illustration, each threshold should be exceeded by a contiguous portion of pixel count 172 to determine the selection of uni-directional printing. Percentage threshold 180 may define a percentage that should be exceeded by pixel count 172. Row threshold 182 may define a number of rows in which the percentage threshold should be exceeded. In the present illustration, the row threshold is about sixty rows. These rows may be contiguous rows, so that the percentage threshold should be exceeded in each of the contiguous rows in order to select uni-directional printing. In the present illustration, the pixel count from each of sixty or more contiguous rows would need to exceed the percentage threshold to satisfy both threshold requirements. In some embodiments, the percentage of non-white pixels may be averaged over two or more rows, so that fluctuations of this percentage in particular rows are averaged out. The row threshold may correspond to about the length of a printhead or nozzle array, that is, the width of a swath of colorant that can be delivered by the printhead, as measured parallel to the y-axis described above. In some embodiments, the row threshold may correspond to about one-half, about one and one-half, or about twice this printhead (or nozzle array) length. In some embodiments, the row threshold may be one row rather than a set of rows.

In the present illustration, the percentage of non-white pixels exceeds percentage threshold 180 in a number of rows defining portions of the text. However, the print data for text image 152 defines a substantial percentage of white pixels, seen as white spaces between and within text 156. In particular, no set of contiguous rows, equal or greater in number than row threshold 182, exceeds percentage threshold 180 in each of the rows of the set. Accordingly, bi-directional mode 160 of printing is selected.

Figure 7:
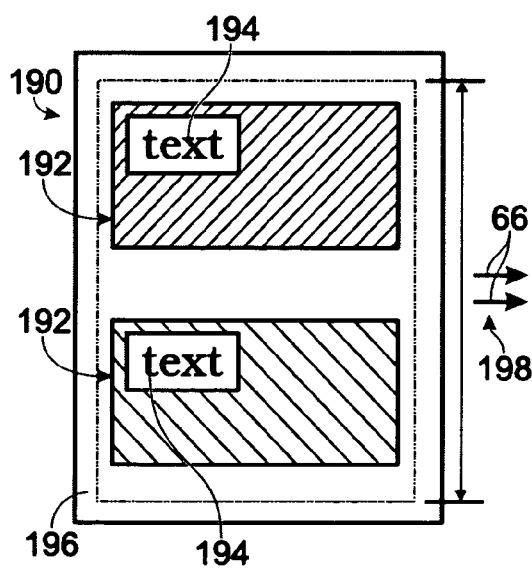
FIG. 7 is a partially schematic view of raster-based graphics printed uni-directionally on a print medium, in accordance with the present teachings.

FIG. 7 shows printed output 190 with a pair of raster-based images 192, including text 194, printed uni-directionally on a print medium 196. Raster-based images 192 may be printed during a plurality of sequential printhead passes over print medium 196, with each pass being in the same direction 66, as indicated at 198.

Figure 8:
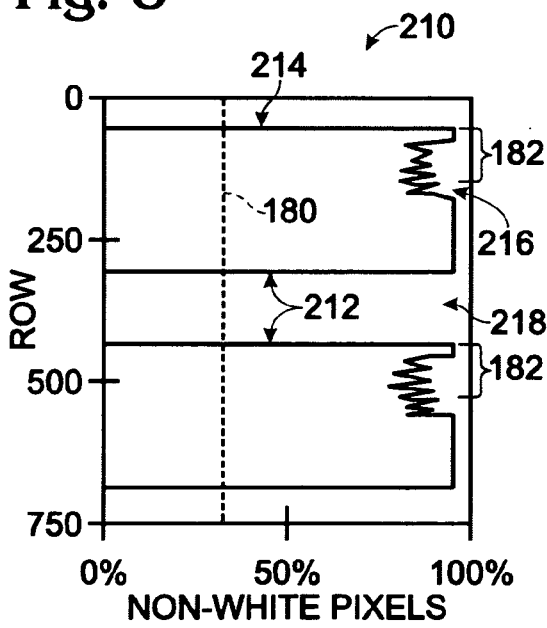
FIG. 8 is a graph of a content analysis of print data corresponding to the raster-based graphics of FIG. 7, in accordance with the present teachings.

FIG. 8 shows a graph 210 of a content analysis of print data corresponding to raster-based images 192 of FIG. 7. Graph 210 plots contone pixel count 212 derived from print data corresponding to the raster-based images 192. In particular, the percentage of non-white contone pixels is plotted versus rows of image elements defined by print data for raster-based images 192, as described above in relation to FIG. 6. Raster-based images 192 may be substantially solid-filled graphics or photographs in appearance. Accordingly, the percentage of non-white pixels in pixel count plots of such images may exceed percentage threshold 180, shown at 214. This threshold percentage may be exceeded in a sufficient number of contiguous or adjacent rows so that row threshold 182 is exceeded, shown at 216. Accordingly, each of raster-based images 192 may be printed in a uni-directional mode. It should be noted the comparison with the thresholds may be restarted where the non-white pixel percentage goes below the threshold, such as in gap 218, so that data for each raster-based image is considered separately to determine the printing mode for this image.

Figure 9:
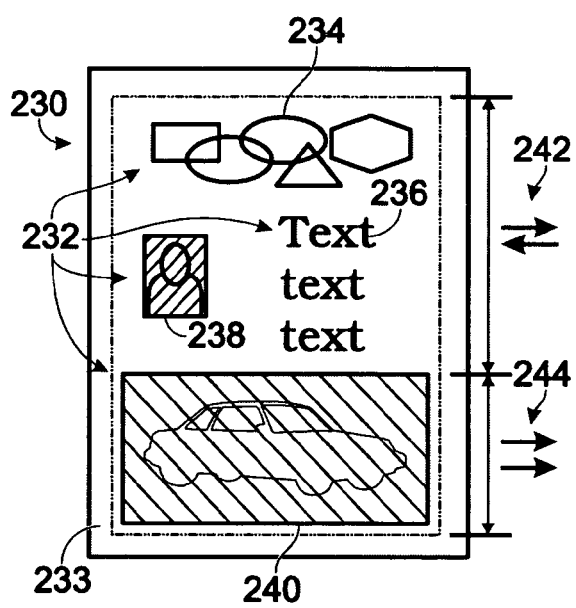
FIG. 9 is a partially schematic view of printed output including vector-based graphics, text, and a small photograph printed bi-directionally on a print medium and a larger photograph printed uni-directionally on the print medium, in accordance with the present teachings.

FIG. 9 shows printed output 230 including a mixture of printed images 232 on a print medium 233. Printed images of output 230 may include line-based graphics 234, text 236, and photographs 238, 240. Line-based graphics 234, text 236, and small photograph 238 may be printed in a bi-directional mode, shown at 242. Larger photograph 240 may be printed in a uni-directional mode, shown at 244.

This uni-directional mode can be in any suitable direction, such as from left to right, or from right to left. In particular, a direction for this uni-directional mode may be selected based on the current position of the printhead(s) when the uni-directional printing is initiated. For example, if the last pass of a previous (bi-directional) printing period was from left to right, uni-directional printing from right to left may be selected as the most efficient transition from bi-directional to uni-directional printing.

Figure 10:
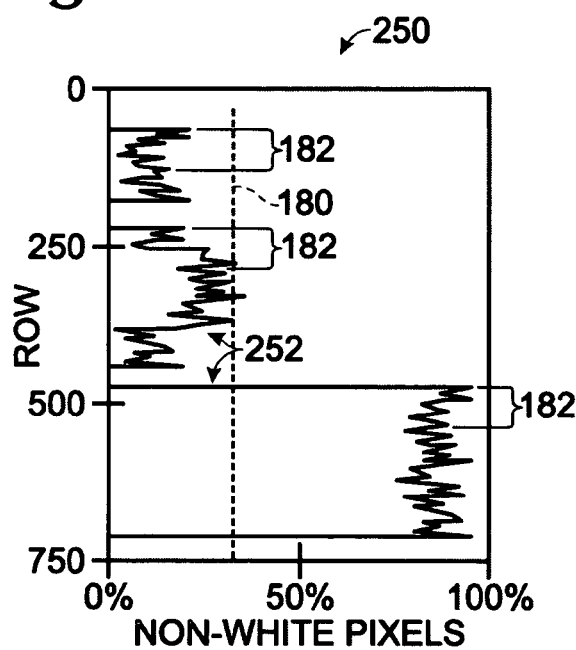
FIG. 10 is a graph of a content analysis of print data corresponding to the printed output of FIG. 9, in accordance with the present teachings.

FIG. 10 shows a graph 250 of a content analysis of print data corresponding to printed images 232 of FIG. 9. Graph 250 plots contone pixel count 252 derived from print data corresponding to the printed images 232. In particular, the percentage of non-white contone pixels is plotted versus rows of image elements defined by print data for printed images 232, as described above in relation to FIG. 6. Print data for line-based graphics 234, text 236, and smaller photograph 238 may not define a sufficient percentage of non-white pixels to exceed each of thresholds 180, 182, thus these images may be printed bi-directionally. By contrast, print data for larger photograph 240 may define a sufficient percentage of non-white pixels to exceed each of thresholds 180, 182. Accordingly, photograph 240 may be printed uni-directionally.

In one exemplary embodiment, the present teachings may be used to switch from one-pass bi-directional printing to one-pass uni-directional printing using page content analysis. One-pass bi-directional printing is a print mode than may increase the performance of inkjet printers. In this mode, inks (colorants) are ejected when the printheads travel from left to right and from right to left. One significant problem of this print mode may be a color hue shift produced between swaths printed by the printheads moving in different directions. This color hue shift may be observed as banding artifacts that degrade print quality. Much effort has been directed to calibrating printers and to control the trickle warming temperature, but this color hue shift problem may remain in some cases.

The present teachings may solve this problem of color hue shift in a different way. The solution may be based on the idea that the color hue shift mainly occurs with large size images, but not text, vector based graphics and small imagettes. In the office or in a home environment, the majority of pages to be printed contain text, graphics, and small imagettes, with large size images representing only a small percentage of printed output. Accordingly, if the presence of large size images can be detected, a one-pass uni-directional print mode can be used selectively to print these large size images. This selective use of a uni-directional print mode may maintain the performance of the printer and avoid problems associated with compensating for a bi-directional color hue shift.

One-pass bi-directional printing is a fast print mode that increases considerably the performance of inkjet printers. However, it has a drawback: it may use two different color maps for printing in two different directions to correct for the color hue shift. These two color maps may be very sensitive to variations in internal and external printing conditions. Factors that influence printing results include ink drop weight variation, printer trickle warming temperature, environmental temperature, and humidity, among others. To compensate for the color hue shift produced by various printing conditions, several methods have been developed: color calibration has been utilized to compensate for ink drop weight variation, and trickle warming temperature has been adaptively controlled to avoid the ramp artifact. However, these methods may be complicated to implement, and they may not compensate for the color hue shift efficiently. The main artifacts produced by one-pass bi-directional printing may be banding artifacts between swaths printed by the printheads moving from left to right and the swaths printed by the printheads moving from right to left. These artifacts may be more visible for raster based images, and almost invisible for text. These banding artifacts may be eliminated by using one-pass uni-directional printing.

A page of printed output may have one or more of three types of content: text, graphics, and raster-based images. Graphics may be further divided into vector-based and raster-based graphics. Vector-based graphics may be similar to text, being mainly line drawings. Raster-based graphics may be similar to images, with most or all pixels filled by colors. Therefore, vector-based graphics may be treated as text, and raster-based graphics may be treated as a raster-based image. Color hue shift artifacts may be most severe for large size images, and less pronounced or absent from small imagettes. An exemplary printhead may have a width of one inch, so an image that is small (less than about one to two inches) may have a color hue shift that is not noticeable. Accordingly, larger size images may be identified according to their data content and printed selectively with a uni-directional mode to suppress the color hue shift artifact. Other print content may be printed more rapidly with a bi-directional mode without substantial degradation of print quality.

Content analysis may be performed by counting all non-white pixels in each raster row or print data corresponding to a page of printed output. Such an analysis may be termed a horizontal projection of the print data and may be performed preferably on contone pixels rather than halftone pixels. Since only non-white pixels are counted, the same algorithm may be used for a black and white image and a color image. These horizontal projections may be plotted relative to the row number (the X-axis) and rotated ninety degrees counterclockwise relative to the graphs show in FIGS. 6, 8, and 10. With print data defining a page of text, the horizontal projection of raster rows (parallel to the printhead scan axis) may be generally characterized by peaks and valleys. A larger image, with few non-white pixels, may be characterized by an elevated plateau(s) or peak(s) with few or no valleys.

Each horizontal projection may be compared with a set of two thresholds related to width (content of each row) and height (number of contiguous rows) of the raster rows. For example, in an exemplary embodiment, the two thresholds may be a width threshold of sixty, corresponding to 60% of the width of the printed region of the page, and a height threshold of one-hundred, corresponding to one-hundred raster rows. Accordingly, in this example, an image should have a content (size) corresponding to at least 60% of the page width in non-white pixel content and one-hundred rows in height at this non-white content, to be printed uni-directionally.

In some embodiments, content analysis may be performed to select the number of passes with which to form each type of printed output. For example, text, vector graphics, and imagettes may be printed with one-pass printing and larger raster-based images may be printed with multiple-pass printing. Multiple-pass printing, as used herein, places colorant on overlapping regions of a print medium during multiples passes of a printhead over the overlapping regions. Single- or one-pass printing places colorant on nonoverlapping regions of a print medium.

It is believed that the disclosure set forth above encompasses multiple distinct embodiments of the invention. While each of these embodiments has been disclosed in specific form, the specific embodiments thereof as disclosed and illustrated herein are not to be considered in a limiting sense as numerous variations are possible. The subject matter of this disclosure thus includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

What is claimed is:

1. A method of printing, comprising:
    receiving print data defining an arrangement of a first set of image elements within an array of first and second sets of image elements, the first set having a different color characteristic than the second set;
    selecting a bi-directional print mode or a uni-directional print mode for placement of colorant-based representations of the image element of the first set onto a print medium based on one or more values corresponding to the percentage of image elements of the first set in (a) the array, (b) one or more portions of the array, (c) or both; and
    placing the colorant-based representations onto the print medium according to the print mode selected and in the arrangement defined by the print data.

2. The method of claim 1, wherein receiving print data includes receiving print data defining at least a portion of one or more of text, graphics, and photographs.

3. The method of claim 1, wherein receiving includes receiving print data defining an arrangement of a first set of image elements having a color characteristic that is non-white in an array of the first set and a second set of image elements having a color characteristic that is white.

4. The method of claim 1, wherein receiving includes receiving print data defining a first set of contone image elements, and wherein placing includes placing one or more colorant-based hatftone representations of each contone image element.

5. A method of printing, comprising:
    receiving print data defining an arrangement of a first set of contone image elements within an array of first and second sets of contone image elements, the first set having a different color characteristic than the second set;
    selecting a bi-directional print mode or a uni-directional print mode for placing colorant-based representations of the first set of contone image elements onto a print medium based on one or more values corresponding to the percentage of contone image elements of the first set in (a) the array, (b) one or more portions of the array, (c) or both; and
    placing the colorant-based representations onto the print medium according to the print mode selected and in the arrangement.

6. The method of claim 5, wherein receiving print data includes receiving print data defining at least a portion of one or more of text, graphics, and photographs.

7. The method of claim 5, wherein receiving includes receiving print data defining an arrangement of a first set of contone image elements having a color characteristic that is non-white in an array of the first set and a second set of contone image elements having a color characteristic that is white.

8. The method of claim 5, wherein the array includes rows, the method further comprising determining the one or more values based on the number of contone image elements of the first set in one or more of the rows.

9. A method of printing, comprising:
    receiving print data defining an arrangement of a first set of image elements in an array of first and second sets of image elements, the first set having a different color characteristic than the second set;
    determining one or more values corresponding to the percentage of image elements of the first set in (a) the array, (b) one or more portions of the array, (c) or both;
    selecting a direction for each of a plurality of passes of one or mare printheads in relation to a print medium based on the one or more values; and
    delivering at least one colorant to the print medium during each of the plurality of passes and in the direction selected for each pass to create colorant-based representations of the image elements of the first set disposed in the arrangement.

10. The method of claim 9, wherein receiving including receiving a first set of image elements having a color characteristic that is non-white and a second set of image elements having a color characteristic that is white.

11. The method of claim 10, wherein the plurality of passes includes a sequential pair of passes configured to deliver the at least one colorant as adjacent swaths to the print medium, and wherein selecting includes selecting one of an equivalent direction and opposing directions for the sequential pair of the passes.

12. The method of claim 11, wherein the array includes rows, the one or more values being row values corresponding to the percentage image elements of the first set in each of the rows, and wherein the equivalent direction is selected if one or more of the row values are greater than a predefined threshold within a predefined number of the rows, the opposing directions being selected if one or more of the row values is less than the predefined threshold within the predefined number of the rows.

13. A printing system, comprising:
    a data manipulation portion configured (1) to receive print data defining an arrangement of a first set of image elements in an array of first and second sets of image elements, the first set having a different color characteristic than the second set, (2) to determine one or more values corresponding to the percentage of image elements of the first set in (a) the array, (b) one or more portions of the array, (c) or both, and (3) to select a direction for each of a plurality of passes in relation to a print medium based on the one or more values; and
    a colorant placement portion in communication with the data manipulation portion and including one or more printheads configured to deliver at least one colorant to the print medium as the printheads perform each of the plurality of passes in the direction selected for each pass to create colorant-based representations of the image elements of the first set disposed in the arrangement.

14. The printing system of claim 13, wherein the data manipulation portion and the colorant placement portion are integrated in a single printing apparatus.

15. The printing system of claim 13, wherein the colorant placement portion is configured to deliver the at least one colorant in a plurality of modes including a uni-directional mode and a bi-directional mode.

16. The printing system of claim 13, wherein the colorant placement portion is configured to fire droplets of the at least one colorant toward the print medium.

17. A program storage device readable by a processor, tangibly embodying a program of instructions executable by the processor to perform a method of producing output, the method comprising:
    receiving print data defining an arrangement of a first set of image elements within an array of first and second sets of image elements, the image elements of the first set having a different color characteristic than the image elements of the second set;

selecting a bi-directional print mode or a uni-directional print mode for placement of representations of the image elements of the first set relative to a print medium based on one or more values corresponding to the percentage of image elements of the first set in (a) the array, (b) one or more portions of the array, (c) or both; and placing the representations of the image elements of the first set relative to the print medium according to the print mode selected and in the arrangement defined by the print data.

18. A printing system, comprising:

means for receiving print data defining an arrangement of a first set of image elements within an array of first and second sets of image elements, the first set having a different color characteristic than the second set;

means for selecting a bi-directional print mode or a uni-directional print mode for placement of colorant-based representations of the image elements of the first set onto a print medium based on one or more values corresponding to the percentage of image elements of the first set, in (a) the array, (b) one or more portions of the array, (c) or both; and means for placing the colorant-based representations onto the print medium according to the print mode selected and in the arrangement defined by the print data.

19. A method to improve the print speed of a printer having uni-directional and bi-directional print modes, comprising:

receiving print data defining printed pixels and non-printed pixels;

determining one or more values corresponding to the percentage of printed pixels or non-printed pixels included in one or more portions of the print data;

selecting a uni-directional print mode or a bi-directional print mode based on the one or more values; and printing the print data with the print mode selected.

20. The method of claim 19, wherein the print data defines a set of rows in which the printed pixels and the non-printed pixels are disposed, and wherein determining includes determining one or more values corresponding to the percentage of printed pixels or non-printed pixels in one or more rows of the set.

21. The method of claim 20, wherein determining includes determining values corresponding to the percentage of printed pixels or non-printed pixels in each row of a contiguous set of rows.

22. The method of claim 19, wherein selecting includes comparing the one or more values with a predefined threshold.

23. The method of claim 22, wherein the one or more values are a plurality of values from a set of rows defined by the print data, wherein selecting includes comparing each of the plurality of values with the predefined threshold, and wherein the uni-directional mode is selected unless each of the plurality of values has a predefined relation with the predefined threshold.

24. The method of claim 19, wherein selecting is performed so that text and vector-based images are printed at least substantially with the bi-directional mode and so that raster-based images of greater than a predefined size are printed at least substantially with the uni-directional mode.

25. A method to improve the print speed of a printer having uni-directional and bi-directional print modes, comprising:

receiving print data defining non-white pixels and white pixels;

determining one or more values corresponding to the percentage of non-white pixels or white pixels included in one or more portions of the print data;

selecting one of the uni-directional print mode and the bi-directional print mode based on the one or more values; and printing the print data with the one print mode selected, wherein selecting is performed so that text and vector-based images are printed at least substantially with the bi-directional mode and so that raster-based images of greater than a predefined size are printed at least substantially with the uni-directional mode.

26. A method to improve the print speed of a printer having uni-directional and bi-directional print modes, comprising:

receiving print data defining non-white pixels and white pixels;

determining one or more values corresponding to the percentage of non-white pixels or white pixels included in one or more portions of the print data;

selecting one of the uni-directional print mode and the bi-directional print mode based on the one or more values; and printing the print data with the one print mode selected, wherein printing is performed by placement of one or more colorants onto a print medium defining a background, and wherein printing creates representations of the white pixels with the background without placement of the colorants.

27. The method of claim 26, wherein printing is performed by placement of the one or more colorants onto a non-white medium, and wherein printing creates non-white representations of the white pixels with the non-white medium.

* * * * *

UNITED STATES PATENT AND TRADEMARK OFFICE
CERTIFICATE OF CORRECTION

PATENT NO. : 7,152,947 B2
APPLICATION NO. : 10/796757
DATED : December 26, 2006
INVENTOR(S) : Yifeng Wu It is certified that error appears in the above-identified patent and that said Letters Patent is hereby corrected as shown below:

In column 9, line 12, in Claim 1, after "image" delete "element" and insert -- elements --, therefor.

In column 9, line 32, in Claim 4, delete "hatftone" and insert -- halftone --, therefor.

In column 10, line 5, in Claim 9, delete "mare" and insert -- more --, therefor.

In column 11, line 24, in Claim 18, after "set" delete ",".

Signed and Sealed this

Eleventh Day of November, 2008

JON W. DUDAS
*Director of the United States Patent and Trademark Office*